(12) United States Patent
Williams et al.

(10) Patent No.: US 8,271,897 B2
(45) Date of Patent: Sep. 18, 2012

(54) METHOD AND SYSTEM FOR NAVIGATING A USER DIALOG CONFIGURED TO ACCOMPLISH A TASK

(75) Inventors: Evelyn Louise Williams, Longmount, CO (US); Birgitta Hettler, Schoenaich (DE); Marko Lamot, Velenje (SI); Janko Spasovski, Maribor (SI)

(73) Assignee: Hewlett-Packard Development Company, L.P., Houston, TX (US)

( * ) Notice: Subject to any disclaimer, the term of this patent is extended or adjusted under 35 U.S.C. 154(b) by 2026 days.

(21) Appl. No.: 11/135,507

(22) Filed: May 24, 2005

(65) Prior Publication Data

US 2005/0273728 A1    Dec. 8, 2005

Related U.S. Application Data

(60) Provisional application No. 60/573,842, filed on May 25, 2004.

(51) Int. Cl.
*G06F 3/048* (2006.01)
(52) U.S. Cl. ........ 715/781; 715/708; 715/711; 715/506; 715/507
(58) Field of Classification Search .................... 715/781
See application file for complete search history.

(56) References Cited

U.S. PATENT DOCUMENTS

| | | | | | |
|---|---|---|---|---|---|
| 5,122,972 | A | * | 6/1992 | Richards et al. | 715/712 |
| 5,371,675 | A | * | 12/1994 | Greif et al. | 715/503 |
| 6,028,602 | A | * | 2/2000 | Weidenfeller et al. | 715/781 |
| 6,950,990 | B2 | * | 9/2005 | Rajarajan et al. | 715/736 |
| 7,131,068 | B2 | * | 10/2006 | O'Neal et al. | 715/730 |
| 7,134,079 | B2 | * | 11/2006 | Brown et al. | 715/730 |
| 2005/0235206 | A1 | * | 10/2005 | Arend et al. | 715/705 |

OTHER PUBLICATIONS

Evelyn L. Williams et al., U.S. Appl. No. 11/135,500, filed May 24, 2005, entitled "Methods and System for Presenting Attributes and Associations of Managed Objects".

* cited by examiner

*Primary Examiner* — Doon Chow
*Assistant Examiner* — Anil Kumar

(57) ABSTRACT

A dialog is configured to display first and second pages of attribute fields to prompt an input of attribute values for use in accomplishing the task. Each page is separately displayable in the dialog. According to exemplary embodiments, a dynamically alterable summary of the attribute fields and values is included on a portion of the first page of the dialog. The attribute fields and values included in the summary are arranged into groups. A first group includes the attribute fields and values displayable on the first page of the dialog, and a second group includes the attribute fields and values displayable on the second page of the dialog. A first software link is provided between the second group and the second page of the dialog to provide automated access to the second page via the second group.

21 Claims, 5 Drawing Sheets

102

Include a Summary of Attribute Fields and Values on a Portion of the First Page of the Dialog

104

Arrange the Attribute Fields and Values into Groups Corresponding to the Page on which the Attribute Fields and Values are Displayable

106

Provide Software Links Between the Groups and Corresponding Pages to Provide Automated Access to the Pages

*FIG. 1*

METHOD AND SYSTEM FOR NAVIGATING A USER DIALOG CONFIGURED TO ACCOMPLISH A TASK

RELATED APPLICATIONS

The present non-provisional application claims priority under 35 U.S.C. §119(e) of Provisional Application Ser. No. 60/573,842, entitled: Method And System For Navigating A User Dialog Configured To Accomplish A Task, filed May 25, 2004, by Evelyn Williams, Birgitta Hettler, Marko Lamot, and Janko Spasovski, the disclosure of which is hereby incorporated by reference in its entirety.

BACKGROUND

1. Field of the Invention

The present invention relates to computer system graphical user interfaces (GUIs). More particularly, the present invention relates to a method and system for navigating a GUI (or user dialog) configured to accomplish a task.

2. Background Information

In computer systems, user dialogs that are designed to gather information from a user to automatically perform a task are commonly referred to as "wizards". A wizard is a special form of user assistance that facilitates the accomplishment of a task through a dialog with the user. Wizards help the user accomplish tasks that can be complex and require experience. Wizards can be used to accomplish almost any task, including creating new objects and formatting the presentation of a set of objects, such as a table or paragraph. They are especially useful for complex or infrequent tasks that the user may have difficulty learning or doing.

Typically, the steps to gather the information to perform the task are presented on different pages of the wizard in a linear fashion. Users typically navigate through all pages in the wizard using a control (e.g., a "Next" button) until presented with a page including another control to close the wizard (e.g., a "Finish" button). Navigating though the wizard in a linear fashion works well for novice users, but the technique can be inflexible for more experienced users.

Some but not all wizards provide a summary of the information gathered on the last page of the wizard. To change a previously set value, users navigate through the wizard in a linear fashion using another control (e.g., a "Back" button) to make the change. Navigating back though the wizard in a linear fashion can create a situation in which users must re-enter values on the pages that they navigate through. After an error is corrected on a prior page, users re-navigate through the pages of the wizard (e.g., using the "Next" button) until once again presented with either the summary, or the page including the control to close the wizard.

With linearly navigable wizards, users are unable to identify undefined information required to perform the task in advance of be presented with the page on which the required information is gathered. In traditional wizards. This can cause users to periodically reference external information when entering information into the wizard. In addition, groups of related information can be gathered and presented on separate pages, yet users can review only one page of information at a time which can lead to errors in the entry of the information.

SUMMARY OF THE INVENTION

Accordingly, a method and system are disclosed for navigating a user dialog configured to accomplish a task. The dialog can be configured to display first and second pages of attribute fields to prompt an input of attribute values for use in accomplishing the task. Each page can be separately displayable in the user dialog. According to exemplary embodiments, a dynamically alterable summary of the attribute fields and values is included on a portion of the first page of the dialog. The attribute fields and values included in the summary are arranged into groups. A first group includes the attribute fields and values displayable on the first page of the dialog, and a second group includes the attribute fields and values displayable on the second page of the dialog. A first software link is provided between the second group and the second page of the dialog to provide automated access to the second page via the second group.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 1 is a flowchart illustrating steps for navigating a user dialog configured to accomplish a task according to an exemplary embodiment;

DETAILED DESCRIPTION OF THE PREFERRED EMBODIMENTS

FIG. 1 is a flowchart illustrating the steps for navigating a user dialog configured to accomplish a task. The dialog can be configured to display first and second pages of attribute fields to prompt an input of attribute values for use in accomplishing the task. Each page can be separately displayable in the user dialog.

In step 102, a dynamically alterable summary of the attribute fields and values is included on a portion of the first page of the dialog. An exemplary summary 208 is included on a portion of the exemplary dialog page 206 shown in FIG. 2. The exemplary dialog page 206 is configured to gather information needed to accomplish the exemplary task of creating a new node, e.g., in a managed computer network. It will be understood that the layout of the dialog page 206 is merely illustrative in that dialog pages having different layouts can be used to practice the steps for navigating a user dialog described in FIG. 1.

Figure 2:
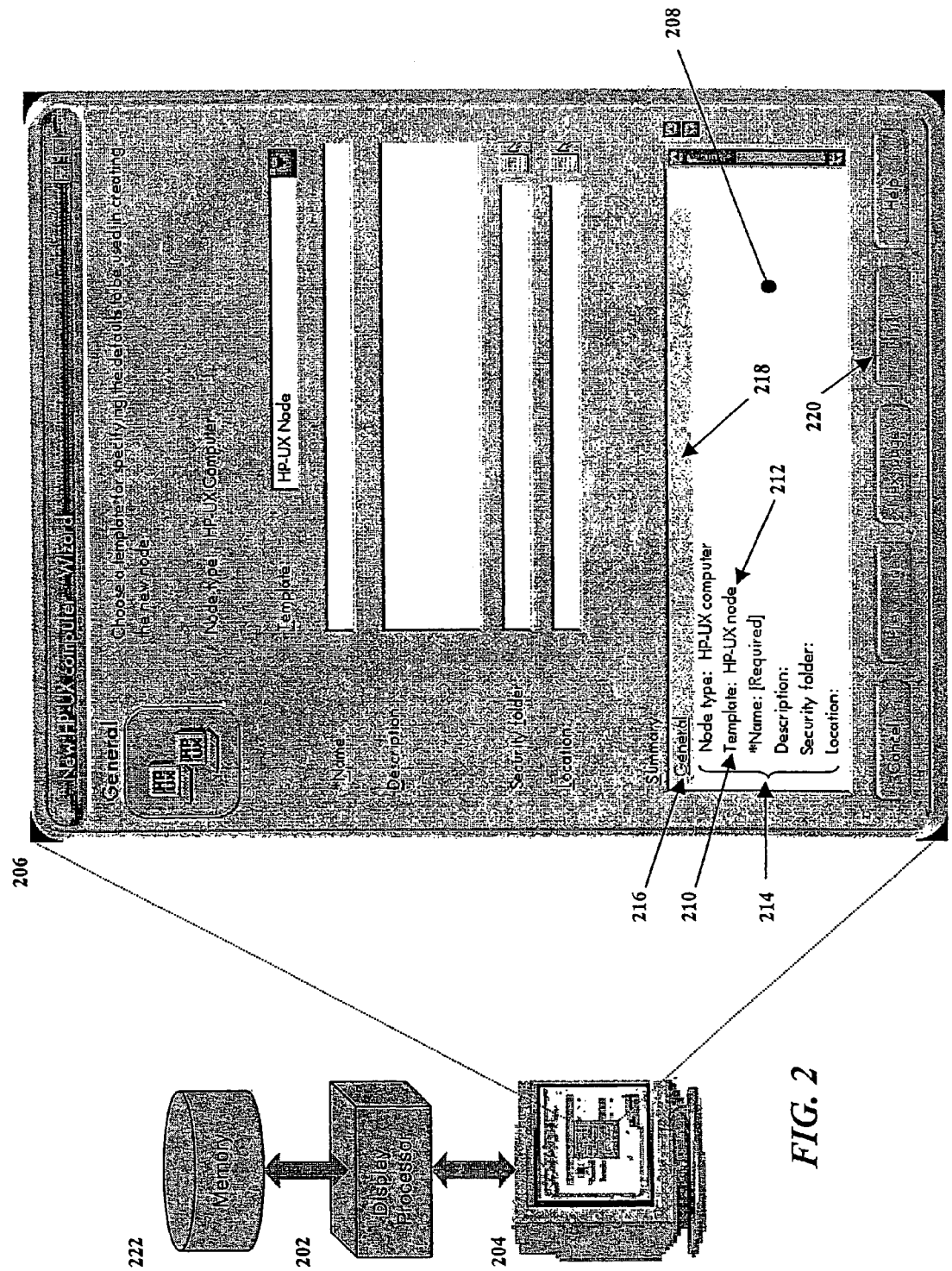
FIG. 2 illustrates a system for navigating a user dialog configured to accomplish a task according to an exemplary embodiment.

The summary 208 provides a listing of all of the attributes fields 210 and corresponding attribute values 212 gathered by the dialog to accomplish the task. Initial attribute values 212 presented in the summary can be provided by templates (e.g., for objects associated with the task the dialog is performing) or by system defaults. The summary 208 can be included on a portion of each page in the dialog (e.g., at the bottom of the dialog page 206 as shown in FIG. 2), and can preferably be included on the same portion of each of the dialog pages (e.g., dialog page 402 shown in FIG. 4A).

Figure 3:
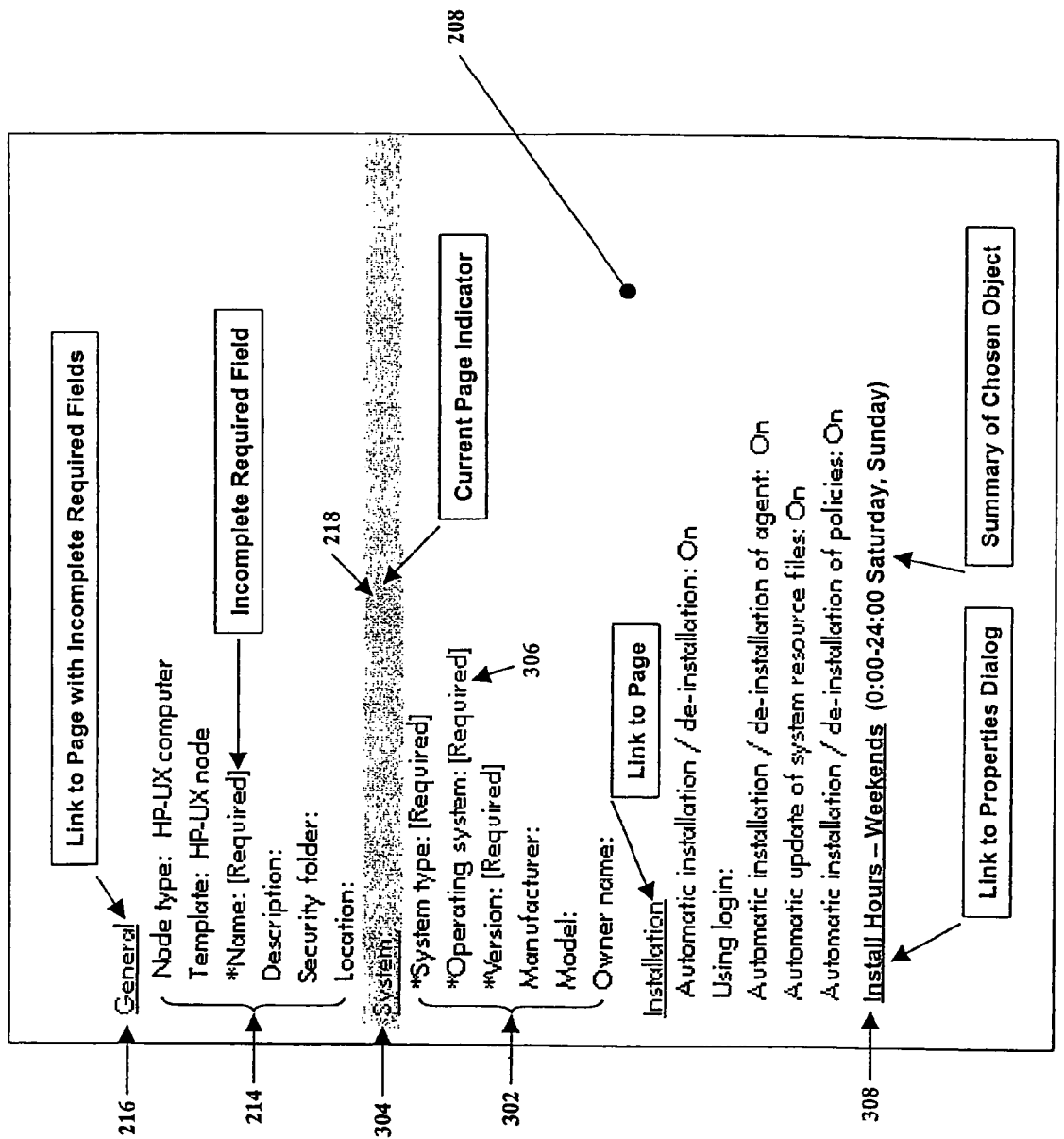
FIG. 3 illustrates a detailed view of a summary shown in FIG. 2.

In step 104, the attribute fields 210 and values 212 included in the summary 208 are arranged into groups. FIG. 3 illustrates a detailed view of the summary 208 shown in FIG. 2. A first group 214 includes the attribute fields and values displayable on the first page of the dialog, and a second group 302 includes the attribute fields and values displayable on the second page of the dialog. According to example, the first group 214 includes attribute fields for providing general information regarding the task. These attribute fields include a node type, template, name, description, security folder, and location of the node to be created. The attributes fields included in the first group 214 correspond to the attribute fields displayable on the first page 206 of the dialog, as shown in FIG. 2.

The second group 302 includes attribute fields for providing information associated with the system that is to be created as a node in the managed computer network. These exemplary attribute fields include a system type, operating system, version, manufacturer, model, and owner name of the node to be created. The attributes fields included in the second group 302 correspond to the attribute fields displayable on the second page 402 of the dialog, as shown in FIG. 4A.

In step 106, a first software link is provided between the second group 302 and the second page 402 of the dialog to provide automated access to the second page 402 via the second group. The first software link can be a hypertext link associated with the second group 302 that is presented in the summary 208. An exemplary "System" hypertext link 304 is shown in FIG. 3. As will be understood by those skilled in art, when a user positions an input selection device (e.g., a mouse) over the hypertext link 304 and makes a selection (e.g., by "clicking" a mouse button), the second page 402 can be displayed, thus providing automated access to the second page 402 via the second group 302.

Figure 4A:
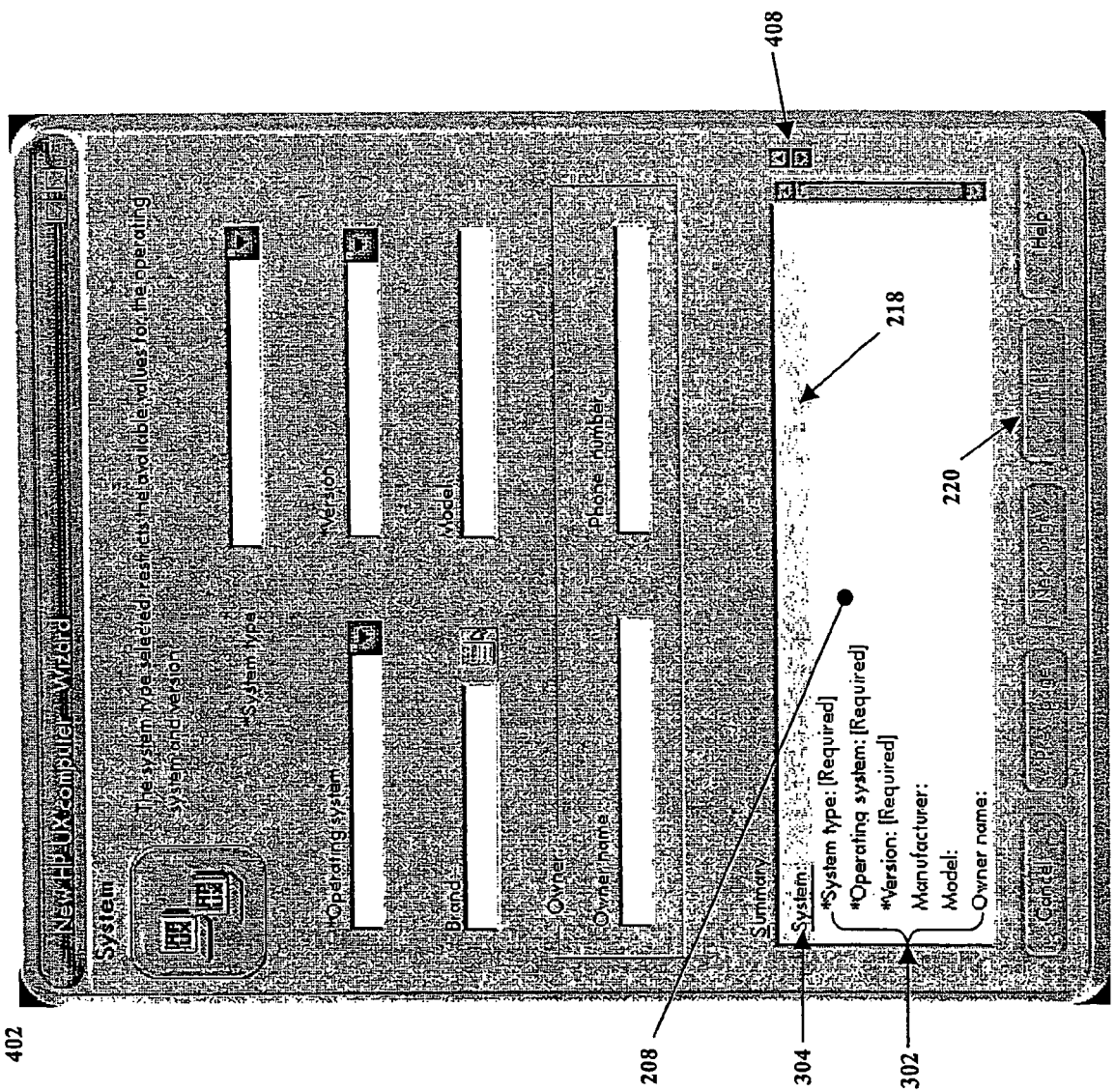
FIGS. 4A and 4B illustrate a page in the user dialog including the summary shown in FIG. 2 in both a compact and an expanded view, respectively, according to an exemplary embodiment.

Similarly, when the summary 208 is included on the second page 402 of the dialog (as shown in FIG. 4A), a first software link can be provided between the first group 214 and the first page 206 of the dialog to provide automated access to the first page 206 via the second group. Again, the first software link can be a hypertext link associated with the first group 214, such as the exemplary "General" hypertext link 216 shown in FIGS. 2 and 3. When the user positions the mouse over the hypertext link 216 and makes a selection, the first page 206 can be displayed, thus providing automated access to the first page 206 via the first group 214. As will be discussed in greater detail below, the first software link can be associated with other text or objects associated with the groups.

According to an exemplary embodiment, an appearance of the summary can be altered to highlight the first group when the first page of the dialog is displayed. Recall that the summary 208 can be included on each page 206/402 of the dialog. With such arrangements, it can be helpful to the user to highlight a group 214/302 presented in the summary 208 corresponding to the page 206/402 that is currently being displayed.

For example, the first group 214 can be positioned at a top portion of the summary 208 when the first page 206 of the dialog is being displayed, as shown in FIG. 2. Similarly, if the summary 208 is also included on the second page 402 of the dialog, as shown in FIG. 4A, the second group 302 can be positioned at the top of the summary 208 to indicate that the second page 402 is being displayed. If the amount of information included in the summary 208 exceeds the portion of the dialog page 402 allocated for its display, the summary can include "scroll bars" to view the information not displayable with the summary 208. Under these circumstances, the second group 302 can be said to be "scrolled" to the top of the summary 208 to indicate that the second page 402 is being displayed.

In addition, visual cues can be added to the summary to indicate when the first page of the dialog is displayed. "Visual cues", as used herein, can include any visual attribute of the summary that can be used to distinguish information associated with a particular function or meaning from other information presented in the summary. An exemplary list of visual attributes includes a unique: relative positioning (i.e., among the information presented in the summary, e.g. indenting, tabbing, hierarchical listing, etc.), color (foreground and background), font, orientation, shading, graphics (e.g., 3D), and text attribute (e.g., underlining, italics, bold, case, etc.) of the information to be distinguished in the summary. Other visual attributes can include additional text (e.g., labels, headers, footers, footnotes, reference indices) and symbols that can be included to distinguish information presented in the summary. It will be understood that the exemplary lists of visual cues provided are not exhaustive.

A combination of the exemplary visual cues described above are used to indicate which page of the dialog is being displayed. For example, in FIG. 2 the "General" hypertext link 216 associated with the first group 214 is presented in the summary 208 using a unique background color 218 to achieve a degree of shading that is distinguishable from other information presented in the summary 208. The visual cue can be used in the summary 208 to indicate that the first page 206 of the dialog is being displayed. Similarly, the "System" hypertext link 304 associated with the second page 402 is presented in the summary 208 using the same background color 218, thus indicating in FIGS. 3 and 4 that the second page 402 of the dialog is currently being displayed.

According to exemplary embodiments, a group label can be added to the second group. Visual cues can then be added to the summary to identify the group label. For example, the "General" and "System" hypertext links 216/304 described above can also function as labels for the first and second groups 214/302, respectively. The group labels 216/304 can describe the general relationship among the attribute fields 210 included in the group. In the exemplary dialog pages shown, several visual cues are used to identify the group labels 216/304. For example, the relative positioning of the attribute fields 214 with respect to their associated group labels 216/304 is offset (or tabbed), producing a hierarchical layout in the summary 208. In addition, the group labels 216/304 are presented using a unique foreground color (e.g., blue), and an underlining text attribute. These visual cues are customary in identifying hypertext links, which the group labels 216/304 can also serve as in the example.

Visual cues can also be added to indicate an undefined attribute value required to accomplish the task. The required undefined attribute value can be one for which no system or template default exists, yet a value must be defined to accomplish the task. For example, the summary 208 shown in FIGS. 3 and 4 includes an attribute field defining the operating system of the node to be added to the managed computer network. No initial value exists in either the system or template defaults, and a value has not yet been specified by the user. But an operating system must be specified for the task of adding the node to the managed network to be accomplished. Accordingly, a combination of visual cues can be added to the summary to indicate the required, but undefined attribute value.

In the examples shown, a text cue 306 of "[Required]" is added to the summary 208. The text cue 306 can be presented in a different foreground color (e.g., red) to further emphasize that a value must be specified to accomplish the task. When a group (e.g., the second group 302) includes the undefined attribute value, additional visual cues can be added to the group label 304 associated with the group 302 to indicate that the group 302 includes attributes that have undefined values that must be specified to accomplish the task. Accordingly, the "System" group label 304 is presented in FIGS. 3 and 4 using a unique foreground color (e.g., red) for group labels. Underlining is still applied to indicate that the group label 304 is associated with the first software link between the second group 302 and the second page 402. Also, in the example, the group label 304 is presented using the background color 218 previously used to indicate that the second page 402 is currently being displayed.

The first software link to provide automated access to the second page 402 can also be associated with the visual cue identifying the undefined attribute value, e.g., the text cue 306, when the second group 302 includes the undefined attribute value. The first software link can again be a hypertext link associated with the text cue 306. When the user positions the mouse over the hypertext link 306 and makes a selection, the second page 402 can be displayed, thus providing automated access to the second page 402 via the second group 302. The first software link associated with the text cue 306 can be configured to provide an input focus on the attribute field having the undefined attribute value when the second page 402 is accessed. For example, when the second page 402 is displayed, an input cursor can be placed in the undefined attribute field, allowing the user to enter a value with an input device, such as a keyboard.

While exemplary embodiments have been described associating the first software link with a group label (e.g., the group label 304) and a visual cue identifying the undefined attribute value (e.g., the text cue 306), it will be understood that the first software link between the second group 302 and the second page 402 of the dialog can be associated with any information included in the second group 302 that is presented in the summary 208.

A second software link can be provided between the visual cue identifying the undefined attribute value, e.g., the text cue 306, and a control to provide an input of the undefined attribute value. An exemplary control is illustrated in the expanded summary view 404, shown in FIG. 4B. The exemplary control is a multiple selection list box 406, and is linked via the second software link to the text cue 306 used to identify the undefined operating system of the system to be added to the managed network. When the user positions the mouse over the text cue 306 and begins a selection (e.g., by "clicking" and "holding" a mouse button), the control 406 can then be displayed, offering a list of possible choices for the undefined attribute value. The user can then "drag" (moving the mouse while holding the mouse button down) to the desired choice, and release the mouse button to make the selection. Visual cues, such as the background coloring/shading can be added to the control 406 to indicate the user's choice (e.g., "Apple OS 10").

Figure 4B:
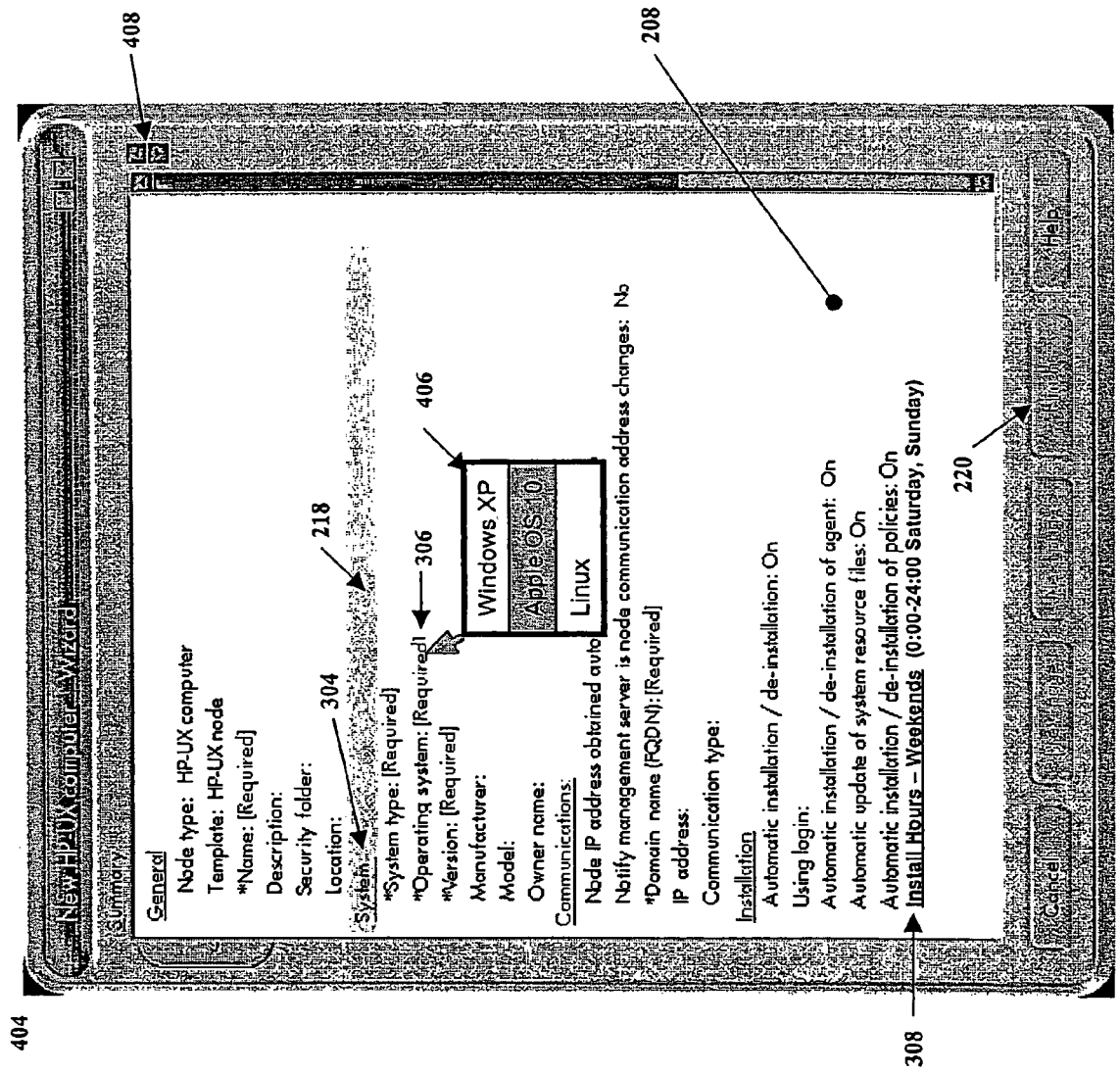

Controls, such as the multiple selection list box 406 shown in FIG. 4B, can be linked to undefined attribute values that are presented in both the compact and expanded summary views. It will be understood that the expanded summary view 404 (discussed in greater detail below) can allow for the presentation of larger and/or more complicated controls than the compact summary view, e.g., the summary 208 included on the lower portion of the second page 402 shown in FIG. 4A. This can occur not only because a greater portion of the dialog page is available for presenting the control in the expanded view 404, but also because of a desire to avoid clutter and confusion in presenting controls to a user in the compact summary view. Other controls that can be presented for defining attribute values include text fields and combination boxes, but the list is not exhaustive.

According to exemplary embodiments, the summary 208 can be expanded to include at least the portion of the first page of the dialog including the attribute fields and values displayable on the first page. An expanded summary view 404 is illustrated in FIG. 4B. Controls, e.g. the "+" and "−" controls 408, can be provided near the summary 208 to expand and contract the summary view. Sophisticated users can expand the summary 208 and specify required attribute values using controls, such as the multiple selection list box 406 described above, without having to navigate through the pages of the dialog. When in its expanded size, the user can still navigate to a specific page in the dialog via the software link between the respective group presented in the dialog and the specific page. Preferable, the summary 208 can automatically return to its compact view when specific page is displayed.

A third software link can be provided between an attribute field included in the summary and a properties dialog to provide automated access to the properties dialog via the linked attribute field. Often, an attribute required to accomplish the task can be an object, itself having associated properties. It can be inconvenient for the user, and perhaps confusing, to present all of the properties associated with such an object in a dialog page or in the summary. Accordingly, the third software link can be provided to allow automated access to a properties page associated with the object.

An exemplary attribute field object 308 is illustrated in FIGS. 3 and 4. The exemplary attribute field object 308 defines the times during which an installation of software and software updates can take place at the node to be created in the managed network. Visual cues can be added to the summary to identify the linked attribute field object 308. For example, in FIGS. 3 and 4 the attribute field object 308 is presented in the summary using a specific foreground color (e.g., blue) and text underlining. Again, these visual cues are customary for identifying hypertext links. In order to distinguish the third software link associated with the object 308 from the first software link associated with a group label (e.g., group label 304), the relative positioning of the object 308 is set such that the object 308 is aligned with other attribute fields (e.g., the attribute fields 210) included in a group (e.g., the second group 302). A summary of the attribute object 308 can be presented summary 208 in place of an attribute value, as shown in FIG. 3.

When the attribute values required to accomplish the task are input, a control can be added to the first page to close the user dialog. For example, a control such as the "Finish" button 220 shown in FIGS. 2-4 can be added to the pages of the dialog. The button 220 can be active or in-active depending on the whether all required attribute fields have defined values or not. Visual cues can be added to the dialog to identify whether the button 220 is active or in-active. For example, in FIGS. 2-4, the "Finish" text on the button 220 is shown to be "grayed-out", indicating that the button 220 is in-active. When values for all of the required fields have been specified, the foreground color of the "Finish" text on the button 220 can be changed (e.g., similar to the "Cancel" button shown in the figures), indicating that the control is now active.

When the control is active, users can close the dialog (e.g., by clicking on the button 220 with a mouse), saving entries and changes made to the attribute values during the dialog session. The "Finish" button 220 can be made available when the summary 208 is presented in both its compact and expanded views. This allows sophisticated users to use the summary 208 to define and save the attribute values required to accomplish the task without having to navigate through all of the pages included in the dialog.

Various aspects of the invention will now be described in connection with exemplary embodiments. To facilitate an understanding of these embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both. Moreover, the exemplary embodiments can be considered part of any form of computer readable storage medium having stored therein an appropriate set of computer instructions that would cause a processor to carry out the techniques described herein.

Thus, the various aspects can be embodied in many different forms, and all such forms are contemplated to be within the scope of what is described. For each of the various aspects, any such form of embodiment can be referred to herein as "logic configured to" perform a described action, or alternatively as "logic that" performs a described action.

An exemplary system for navigating a user dialog configured to accomplish a task is shown in FIG. 2. The dialog is configured to display first and second pages of attribute fields to prompt an input of attribute values for use in accomplishing the task. Each page in the user dialog is separately displayable. The exemplary system includes a processor 202 and a display 204 configured to display the user dialog. The exemplary dialog is configured to accomplish the task of creating a node in a managed computer network.

The processor 202 includes logic configured to include a dynamically alterable summary 208 of the attribute fields 210 and values 212 on a portion of the first page 206 of the dialog. Initial attribute values 212 presented in the summary can be provided by templates (e.g., for objects associated with the task the dialog is performing) or by system defaults. The template or system default information can be stored in memory 222. The summary 208 can be included on a portion of each page in the dialog (e.g., at the bottom of the dialog page 206 as shown in FIG. 2), and can preferably be included on the same portion of each of the dialog pages (e.g., dialog page 402 shown in FIG. 4A).

The processor 202 also includes logic configured to arrange the attribute fields 210 and values 212 included in the summary 208 into groups, a first group 214 including the attribute fields 210 and values 212 displayable on the first page 206 of the dialog, and a second group 302 including the attribute fields and values displayable on the second page 402 of the dialog. Logic configured to provide a first software link between the second group 302 and the second page 402 of the dialog is included in the processor 202 to provide automated access to the second page 402 via the second group 302.

Logic can also be configured to alter an appearance of the summary 208 to highlight the first group 214 when the first page 206 of the dialog is displayed. This logic can be configured to position the first group 214 at a top portion of the summary 208, as shown in FIG. 2. Similarly, FIG. 4A shows the second group 302 positioned at the top portion of the summary 208 when the second page 402 of the dialog is being displayed. The logic to alter the appearance of the summary can also be configured to add visual cues to the summary 208 to indicate when the first page 206 of the dialog is displayed, such as the background coloring 218 shown in FIGS. 2 and 4.

The processor 202 can also include logic configured to add a group label 304 to the second group 302. In the examples shown in FIGS. 2-4, the "System" group label 304 for the second group 302 describes that the attribute fields included in the second group 302 are related to a system that can be created as the node in the managed network. This logic can be configured to add group labels to other groups included in the summary 208, e.g., the "General" group label 216 added to the group 214 shown in FIG. 2. The first software link to provide automated access to the second page can be associated with the group labels. For example, the group labels 216/304 can be configured to function as hypertext links that, when selected by a user, display the respective page of the dialog, thus providing automated access to the dialog page.

Additional logic can be configured to add visual cues to the summary to identify the group label. For example, the relative positioning of the attribute fields 214 with respect to their associated group labels 216/304 is offset (or tabbed), producing a hierarchical layout in the summary 208. In addition, the group labels 216/304 are presented using a unique foreground color (e.g., blue), and an underlining text attribute. These visual cues are customary in identifying hypertext links, which the group labels 216/304 can also serve as in the example.

The processor 202 can also include logic configured to add visual cues to an undefined attribute value required to accomplish the task. As described above, the "[Required]" text cue 306 can be added to the summary 208 to indicate that an operating system attribute value must be defined by the user before the task can be accomplished. When a group (e.g., the second group 302) includes an undefined attribute value, additional visual cues can be added to the group label (e.g., label 304) to indicate as much. For example, a different foreground color (e.g., red) can be used to distinguish group labels added for groups that have undefined required attribute values.

The first software link can be associated with the visual cue identifying the undefined attribute value. Accordingly, the first software link can be associated with the text cue 306, such that a hyperlink is formed to provide automated access to the second page 402. Additional logic can be configured to provide an input focus, such a cursor focus for a keyboard, on the attribute field having the undefined attribute value (e.g., the operating system attribute field) when the second page 402 is accessed, prompting the user to enter a value for the required field.

The processor 202 can also include logic configured to provide a second software link between the visual cue identifying the undefined attribute value, such as the text cue 306, and a control, such as the multiple selection box 406, to provide an input of the undefined attribute value. As shown in FIG. 4B, the control 406 can be displayable on the portion of the page of the dialog including the summary 208.

Logic configured to expand the summary to include at least the portion of the first page of the dialog including the attribute fields and values displayable on the first page can also be included in the processor 202. An exemplary expanded view 404 of the summary 208 is shown in FIG. 4B. A control 408 can be provided to expand the summary view (e.g., the "+" button) or contract the summary view (e.g., the "−" button).

Additional logic can be included in the processor 202 that can be configured to provide a third software link between an attribute field included in the summary and a properties dialog to provide automated access to the properties dialog via the linked attribute field. The attribute field 308 shown in FIGS. 3 and 4 is such an object. The logic can also be included to add visual cues to the summary to identify the linked attribute field, such as the unique combination of foreground coloring, text underlining, and relative positioning shown in the figures. The logic can also present a description of the object in place of an attribute value in the summary 208 (e.g., "(0:00-24:00 Saturday, Sunday)").

The processor 202 can also include logic configured to add a control to the first page to close the user dialog when the attribute values required to accomplish the task are input. As described above, a control, such as the "Finish" button 220, can be made to be active or in-active depending on whether the required attribute fields have defined values or not. When active, a sophisticated user can close the dialog, saving changes made during the dialog session, without having to navigate through all pages included in the dialog.

The steps of a computer program as illustrated in FIG. 1 for navigating a user dialog configured to accomplish a task can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for navigating a user dialog configured to accomplish a task, the dialog being configured to display first and second pages of attribute fields to prompt an input of attribute values for use in accomplishing the task, each page being separately displayable in the user dialog, the method comprising:
    including a dynamically alterable summary of the attribute fields and values on a portion of the first page of the dialog;
    arranging the attribute fields and values included in the summary into groups, a first group including a first group of attribute fields and respective values of the first group of attribute fields displayable on the first page of the dialog, and a second group including a second group of attribute fields and respective values of the second group of attribute fields displayable on the second page of the dialog; and providing a first software link between the second group and the second page of the dialog to provide automated access to the second page via the second group;
    wherein the first group of attribute fields differs from the second group of attribute fields.

2. The method of claim 1, comprising:
    altering an appearance of the summary to highlight the first group when the first page of the dialog is displayed.

3. The method of claim 2, wherein the altering comprises at least one of:
    positioning the first group at a top portion of the summary; and
    adding visual cues to the summary to indicate when the first page of the dialog is displayed.

4. The method of claim 1, comprising:
    adding a group label to the second group; and
    adding visual cues to the summary to identify at least one of:
        the group label;
        an undefined attribute value required to accomplish the task; and
        the group label when the second group includes the undefined attribute value.

5. The method of claim 4, wherein the first software link to provide automated access to the second page is associated with the group label.

6. The method of claim 4, wherein the first software link is associated with the visual cue identifying the undefined attribute value when the second group includes the undefined attribute value, the method comprising:
    providing an input focus on the attribute field having the undefined attribute value when the second page is accessed.

7. The method of claim 4, comprising:
    providing a second software link between the visual cue identifying the undefined attribute value and a control to provide an input of the undefined attribute value;
    wherein the control is displayable on the portion of the first page of the dialog including the summary.

8. The method of claim 1, comprising:
    expanding the summary to include at least the portion of the first page of the dialog including the first group of attribute fields and the respective values of the first group of attribute fields displayable on the first page.

9. The method of claim 1, comprising:
    providing a third software link between an attribute field included in the summary and a properties dialog to provide automated access to the properties dialog via the linked attribute field; and
    adding visual cues to the summary to identify the linked attribute field;
    wherein the linked attribute field is associated with an object having properties included in the properties dialog.

10. The method of claim 1, comprising:
    adding a control to the first page to close the user dialog when the attribute values required to accomplish the task are input.

11. A system for navigating a user dialog configured to accomplish a task, the dialog being configured to display first and second pages of attribute fields to prompt an input of attribute values for use in accomplishing the task, each page being separately displayable in the user dialog, the system comprising:
    a processor, including:
        logic configured to include a dynamically alterable summary of the attribute fields and values on a portion of the first page of the dialog;
        logic configured to arrange the attribute fields and values included in the summary into groups, a first group including a first group of attribute fields and respective values of the first group of attribute fields displayable on the first page of the dialog, and a second group including a second group of attribute fields and respective values of the second group of attribute fields displayable on the second page of the dialog; and logic configured to provide a first software link between the second group and the second page of the dialog to provide automated access to the second page via the second group; and a display configured to display the user dialog;

wherein the first group of attribute fields differs from the second group of attribute fields.

12. The system of claim 11, wherein the processor comprises:

logic configured to alter an appearance of the summary to highlight the first group when the first page of the dialog is displayed.

13. The system of claim 12, wherein the logic configured to alter comprises at least one of:

logic configured to position the first group at a top portion of the summary; and logic configured to add visual cues to the summary to indicate when the first page of the dialog is displayed.

14. The system of claim 11, wherein the processor comprises:

logic configured to add a group label to the second group; and logic configured to add visual cues to the summary to identify at least one of:

the group label;

an undefined attribute value required to accomplish the task; and the group label when the second group includes the undefined attribute value.

15. The system of claim 14, wherein the first software link to provide automated access to the second page is associated with the group label.

16. The system of claim 14, wherein the first software link is associated with the visual cue identifying the undefined attribute value when the second group includes the undefined attribute value, the processor comprising:

logic configured to provide an input focus on the attribute field having the undefined attribute value when the second page is accessed.

17. The system of claim 14, wherein the processor comprises:

logic configured to provide a second software link between the visual cue identifying the undefined attribute value and a control to provide an input of the undefined attribute value;

wherein the control is displayable on the portion of the first page of the dialog including the summary.

18. The system of claim 11, wherein the processor comprises:

logic configured to expand the summary to include at least the portion of the first page of the dialog including the first group of attribute fields and the respective values of the first group of attribute fields displayable on the first page.

19. The system of claim 11, wherein the processor comprises:

logic configured to provide a third software link between an attribute field included in the summary and a properties dialog to provide automated access to the properties dialog via the linked attribute field; and adding visual cues to the summary to identify the linked attribute field;

wherein the linked attribute field is associated with an object having properties included in the properties dialog.

20. The system of claim 11, wherein the processor comprises: logic configured to add a control to the first page to close the user dialog when the attribute values required to accomplish the task are input.

21. A non-transitory computer-readable medium containing a computer program for navigating a user dialog configured to accomplish a task, the dialog being configured to display first and second pages of attribute fields to prompt an input of attribute values for use in accomplishing the task, each page being separately displayable in the user dialog, wherein the computer program performs the steps of:

including a dynamically alterable summary of the attribute fields and values on a portion of the first page of the dialog;

arranging the attribute fields and values included in the summary into groups, a first group including a first group of attribute fields and respective values of the first group of attribute fields displayable on the first page of the dialog, and a second group including a second group of attribute fields and respective values of the second group of attribute fields displayable on the second page of the dialog; and providing a first software link between the second group and the second page of the dialog to provide automated access to the second page via the second group;

wherein the first group of attribute fields differs from the second group of attribute fields.

* * * * *